(12) United States Patent
Walker et al.

(10) Patent No.: US 10,300,498 B2
(45) Date of Patent: May 28, 2019

(54) CENTRIFUGE SEALS AND SEALING ARRANGEMENTS AND CENTRIFUGES CONTAINING THE SAME

(71) Applicant: FLSmidth A/S, Valby (DK)

(72) Inventors: Mathew Walker, Brisbane (AU); Michael J. Gardiner, Capalaba (AU); Tony Elliott, Brisbane (AU)

(73) Assignee: FLSmidth A/S (DK)

( * ) Notice: Subject to any disclaimer, the term of this patent is extended or adjusted under 35 U.S.C. 154(b) by 56 days.

(21) Appl. No.: 15/509,229

(22) PCT Filed: Sep. 17, 2015

(86) PCT No.: PCT/IB2015/057162
§ 371 (c)(1),
(2) Date: Mar. 7, 2017

(87) PCT Pub. No.: WO2016/046704
PCT Pub. Date: Mar. 31, 2016

(65) Prior Publication Data
US 2017/0282194 A1     Oct. 5, 2017

Related U.S. Application Data

(60) Provisional application No. 62/055,236, filed on Sep. 25, 2014.

(51) Int. Cl.
*B04B 7/00* (2006.01)
*B04B 3/06* (2006.01)
*F16J 15/3216* (2016.01)

(52) U.S. Cl.
CPC ............... *B04B 7/00* (2013.01); *B04B 3/06* (2013.01); *F16J 15/3216* (2013.01)

(58) Field of Classification Search
CPC . B04B 7/00; B04B 3/06; F16J 15/3248; F16J 15/3216; F16J 15/3252; F16J 15/3256; F16J 15/3268; F16J 15/3272
See application file for complete search history.

(56) References Cited

U.S. PATENT DOCUMENTS 3,477,098 A    11/1969  Swickard et al.
3,828,524 A *   8/1974  Booth ................. B04B 5/00
                                                   55/317
(Continued)

FOREIGN PATENT DOCUMENTS

CN    202708086 U    1/2013
DE    20201457 U1    5/2002
(Continued)

OTHER PUBLICATIONS

International Search Report and Written Opinion dated Nov. 4, 2015, 8 pages.

*Primary Examiner* — Eugene G Byrd
(74) *Attorney, Agent, or Firm* — Jeffrey A. Sharp

(57) ABSTRACT

A seal for a centrifuge for preventing material from leaking out of an effluent portion into a drive portion where the seal is disposed between a basket carrier and a drive portion, and the basket carrier is disposed between the effluent portion and the drive portion. The seal can also be disposed on a stiffener, the stiffener disposed between the basket carrier and the drive portion. A sealing arrangement for a centrifuge including a contact seal and a labyrinth disc, for preventing liquid from leaking out of an effluent portion into a product discharge outlet and for preventing material from entering into the effluent portion through the product discharge outlet. Also provided is a centrifuge incorporating the seal and/or the sealing arrangement.

13 Claims, 10 Drawing Sheets

(56) References Cited

U.S. PATENT DOCUMENTS

| | | | |
|---|---|---|---|
| 4,140,268 A * | 2/1979 | Lacour | B04B 7/00 494/41 |
| 4,529,209 A | 7/1985 | Nii et al. | |
| 4,848,776 A * | 7/1989 | Winckler | F16J 15/3256 277/349 |
| 4,900,442 A * | 2/1990 | Connolly | B04B 3/06 210/380.3 |
| 5,312,319 A * | 5/1994 | Salter | B04B 7/00 269/268 |
| 5,505,683 A * | 4/1996 | Geringer | B04B 7/00 494/12 |
| 6,237,207 B1 * | 5/2001 | Vom Stein | B25B 23/08 269/47 |
| 6,517,612 B1 | 2/2003 | Crouch et al. | |
| 8,940,068 B2 * | 1/2015 | Smith | F01M 13/04 123/41.86 |
| 9,751,094 B2 * | 9/2017 | Gardiner | B04B 11/06 |
| 2007/0213191 A1 * | 9/2007 | Chammas | B04B 5/0442 494/41 |
| 2008/0153686 A1 * | 6/2008 | Rochat | B04B 5/0442 494/45 |
| 2009/0253565 A1 * | 10/2009 | Kohlstette | B04B 7/00 494/12 |
| 2011/0285089 A1 * | 11/2011 | Epshetsky | F16J 15/3244 277/306 |
| 2011/0294642 A1 * | 12/2011 | Murayama | B04B 5/0421 494/14 |
| 2012/0329630 A1 | 12/2012 | Hoffmann | |
| 2014/0217008 A1 * | 8/2014 | Angus | B04B 3/06 210/367 |

FOREIGN PATENT DOCUMENTS

| | | |
|---|---|---|
| EP | 0242458 A2 | 10/1987 |
| GB | 972479 A | 10/1964 |

* cited by examiner

CENTRIFUGE SEALS AND SEALING ARRANGEMENTS AND CENTRIFUGES CONTAINING THE SAME

FIELD OF THE INVENTION

The present invention relates to a centrifuge. In particular, the present invention relates, but is not limited, to improved seals and sealing arrangements in the regions between the effluent portion and the drive portion and between the effluent portion and the product discharge outlet; and centrifuges incorporating such seals and sealing arrangements.

BACKGROUND TO THE INVENTION

Reference to background art herein is not to be construed as an admission that such art constitutes common general knowledge in the United States, Australia or elsewhere.

Centrifugal separators are often used for the separation of solids and liquids from slurry. For example, U.S. Pat. No. 6,109,453 and US Patent Application Publication No. 2014/0217008 A1 show such separators. Such separators are used e.g. for separating coal solids from a coal slurry that includes water. These centrifuges typically have an inlet where slurry is deposited and then conveyed to a rotational basket. The slurry next traverses the rotational basket, with the liquids being expelled outwards through the basket and the solids being carried down tapered sides of the basket. When solids reach an outermost edge of the basket, the solids leave the outermost edge of the basket at speed and strike the walls of an outlet region of the centrifuge. The solids are then channelled by the walls of the outlet region to an outlet chute.

Coarse coal centrifuges, such as the FLSmidth VM series, incorporate an opening in the back wall of the separation housing to allow the drive shaft and flange to pass through into the effluent portion. This opening often results in material (e.g. water and fine solids) passing into the drive portion of the centrifuge leading to maintenance difficulties, accelerated corrosion and accelerated wear of the critical drive components that govern the operation of the machine. US Patent Application Publication No. 2014/0217008 A1 discloses a rubber seal between the separation housing and the bearing housing. However, such a seal is inefficient. While that seal prevents material inside the separation housing from leaking out of the centrifuge, it does not prevent material from inside the separation housing from leaking into the drive portion of the centrifuge.

A solution for reducing the amount of or eliminating completely, material and liquid contamination around and into the drive portion is needed to ensure longevity and to reduce the risk of premature failure of drive components. However, as machine cost is a critical concern for most clients when purchasing a centrifuge it is necessary that the solution is inexpensive to manufacture and quick to install. Because the system is also exposed to water, air and fine particle abrasion such a solution will also need to be able to withstand the foregoing elements.

Coarse coal centrifuges also require some means of restricting material from passing out of the product discharge outlet back into the effluent portion is after separation and some means of restricting liquid from leaking out of the effluent portion to the product discharge outlet after separation. Traditionally, as is the case for FLSmidth's VM centrifuge and as shown in FIG. 9, this is achieved through the use of close running clearances between the basket and the separation housing. However, such an approach is costly and inefficient.

In order to reduce the cost (introduced by the requirement for machining of the separation housing and basket to achieve close running clearances) and to improve the separation between the material and liquid in the product discharge outlet an improved sealing arrangement is required.

OBJECT OF THE INVENTION

It is an aim of this invention to provide a centrifuge seal and sealing arrangement which overcome or ameliorate one or more of the disadvantages or problems described above, or which at least provide a useful alternative.

Other preferred objects of the present invention will become apparent from the following description.

SUMMARY OF INVENTION

According to a first aspect of the invention, there is provided a seal for a centrifuge for preventing material from leaking out of the effluent portion into the drive portion. The seal is disposed between a basket carrier and the drive portion. And, the basket carrier is disposed between the effluent portion and the drive portion. The seal can be further disposed between a stiffener and the drive portion, the stiffener being disposed between the basket carrier and the drive portion. The seal can be annular. The seal can be comprised of polyurethane. In some embodiments the seal is comprised of a sealing portion and an attachment portion. In some arrangements, at least a portion of the sealing portion abuts at least a portion of the basket carrier and at least a portion of the attachment portion abuts at least a portion of the stiffener. The sealing portion and the attachment portion can be integrally formed.

In another aspect of the invention the seal described above is incorporated is into a centrifuge. A centrifuge is provided wherein the centrifuge is comprised of an effluent portion a drive portion, a basket carrier disposed between the effluent portion and the drive portion, a stiffener disposed between the basket carrier and the drive portion, and a seal for preventing material or liquid from leaking out of the effluent portion into the drive portion. The seal is disposed between the basket carrier and the stiffener. In such a centrifugal arrangement the seal can be annular. The seal can be comprised of polyurethane. In some embodiments of the centrifuge, the seal can be comprised of a sealing portion and an attachment portion. In some arrangement of the centrifuge, at least a portion of the sealing portion abuts at least a portion of the basket carrier and at least a portion of the attachment portion abuts at least a portion of the stiffener. The sealing portion and the attachment portion can be integrally formed.

According to a second aspect of the invention, there is provided a contact seal for a centrifuge for preventing liquid from leaking out of the effluent portion into the product discharge outlet and for preventing material from entering into the effluent portion through the product discharge outlet. The contact seal is disposed on a labyrinth disc and the labyrinth disc is disposed between the effluent portion and the product discharge outlet. The contact seal can be disposed vertically on a first face of the labyrinth disc. The contact seal can be comprised of polyurethane. The contact seal can be comprised of a vertical portion and a lip. The vertical portion can be disposed parallel to or substantially parallel to a vertical portion of the labyrinth disc. The lip can extend in the horizontal direction across at least a portion of the space between the effluent portion and the product discharge outlet. The vertical portion and the lip can be integrally formed. The contact seal can be comprised of a plurality of first apertures, wherein the contact seal is attached to said labyrinth disc with bolts or fasteners.

In another aspect of the invention the seal described above is incorporated into a centrifuge. A centrifuge is provided wherein the centrifuge is comprised of an effluent portion, a product discharge outlet, a sealing arrangement comprised of a labyrinth disc and a contact seal for preventing liquid from leaking out of the effluent portion into the product discharge outlet and for preventing material from entering into the effluent portion through the product discharge outlet. The labyrinth disc is disposed between the effluent portion and the product discharge outlet and the contact seal is disposed on the labyrinth disc. In such a centrifugal arrangement, the contact seal can be disposed vertically on a first face of the labyrinth disc. The contact seal can be comprised of polyurethane. In some embodiments of the centrifuge, the contact seal can be comprised of a vertical portion and a lip. The vertical portion can be disposed parallel to or substantially parallel to a vertical portion of the labyrinth disc. The lip can extend in the horizontal direction across at least a portion of the space between the effluent portion and the product discharge outlet. The vertical portion and the lip can be integrally formed. In some embodiments of the centrifuge, the contact seal can be comprised of a plurality of first apertures, wherein the contact seal is attached to the labyrinth disc with bolts or fasteners.

A labyrinth disc for a centrifuge is also provided. The labyrinth disc prevents liquid from leaking out of the effluent portion into the product discharge outlet and prevents material from entering into the effluent portion through the product discharge outlet. A contact seal is disposed on the labyrinth disc and the labyrinth disc is disposed between the effluent portion and the product discharge outlet.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
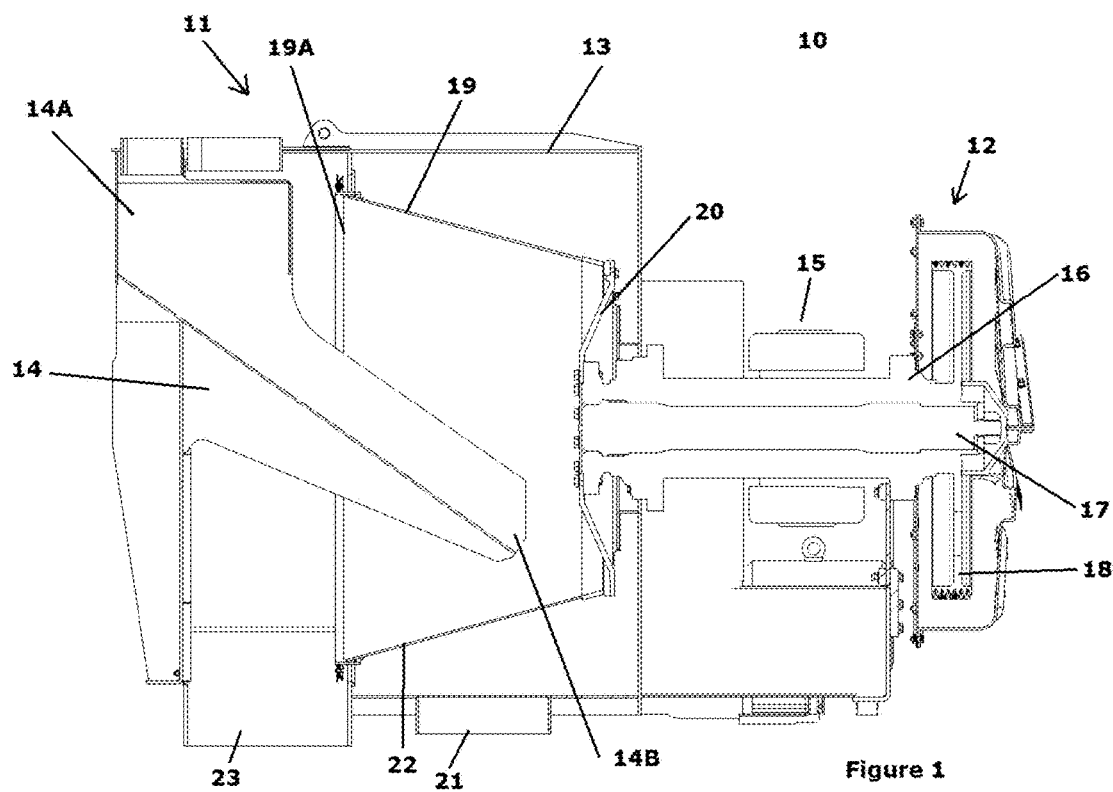
FIG. 1 is a side cross sectional view of a centrifuge according to an embodiment of the invention.

FIG. 1 illustrates a centrifuge 10 having an effluent portion 11 and a drive portion 12. The effluent portion 11 has a separation housing 13 which defines the boundaries of the effluent portion 11. The separation housing 13 has an inlet in the form of a chute 14 which material to be separated, such as slurry, is conveyed to inside the separation housing 13, as will be discussed herein.

The drive portion 12 can contain a number of components which move together in use. For example, the drive portion can contain motors 15 which are configured such that in use they rotate in opposite directions (i.e. counter rotating). These components can also include a bearing housing 16, a drive shaft 17, a drive pulley 18 and other components such as bearings and bearing covers.

It can be seen that the centrifuge 10 has a separation screen in the form of a basket 19. The basket 19 is engaged with a basket carrier 20, and rotates with, the drive shaft 17 via the basket carrier 20. The basket 19 can have basket stiffeners 24 (as depicted e.g. in FIG. 4) which provide axial rigidity to the basket 19. The chute 14 has an inlet end 14A and an outlet end 14B which conveys the material to be separated from a source (not shown) to inside the is separation housing 13. The separation housing 13 has a first outlet 21 which allows material separated by the centrifuge 10, namely liquid components of the slurry that pass through apertures in the basket 19, to be removed from the centrifuge 10. A product discharge outlet 23 allows material that does not pass through the apertures in the basket 19 to also be removed from the centrifuge 10.

A material to be separated, such as slurry being a combination of solids and liquids, is fed into the inlet end 14A of the chute 14 where it is conveyed to the outlet end 14B inside the separation housing 13. The material to be separated hits the sides of the basket 19, which has apertures, and is rotated which applies centrifugal force to the material. The liquid component of the slurry passes through the apertures in the basket 19 while the solid component cannot.

The liquids, which are usually undesirable, are drained down a first outlet 21 for further processing and/or disposal. The solid component which cannot pass through the basket 19 traverses the inclined walls of the basket 19 under centrifugal force. The axial vibration provided by the drive portion 12 assists in movement of the solids along basket 19 and prevents, or at least minimizes, build-up of solid material on the inner surface of the basket 19. When the material reaches the outermost edge 19A it primarily comprises the solid component of the material as the liquid component has been removed. The solids may then be transferred for further processing or collection, or the like via the product discharge outlet 23.

Other general and specific components of the centrifuge 10 (and typical centrifuges) may be appreciated from US Patent Application Publication No. 2014/0217008 A1 which is hereby fully incorporated by reference herein.

Figure 2:
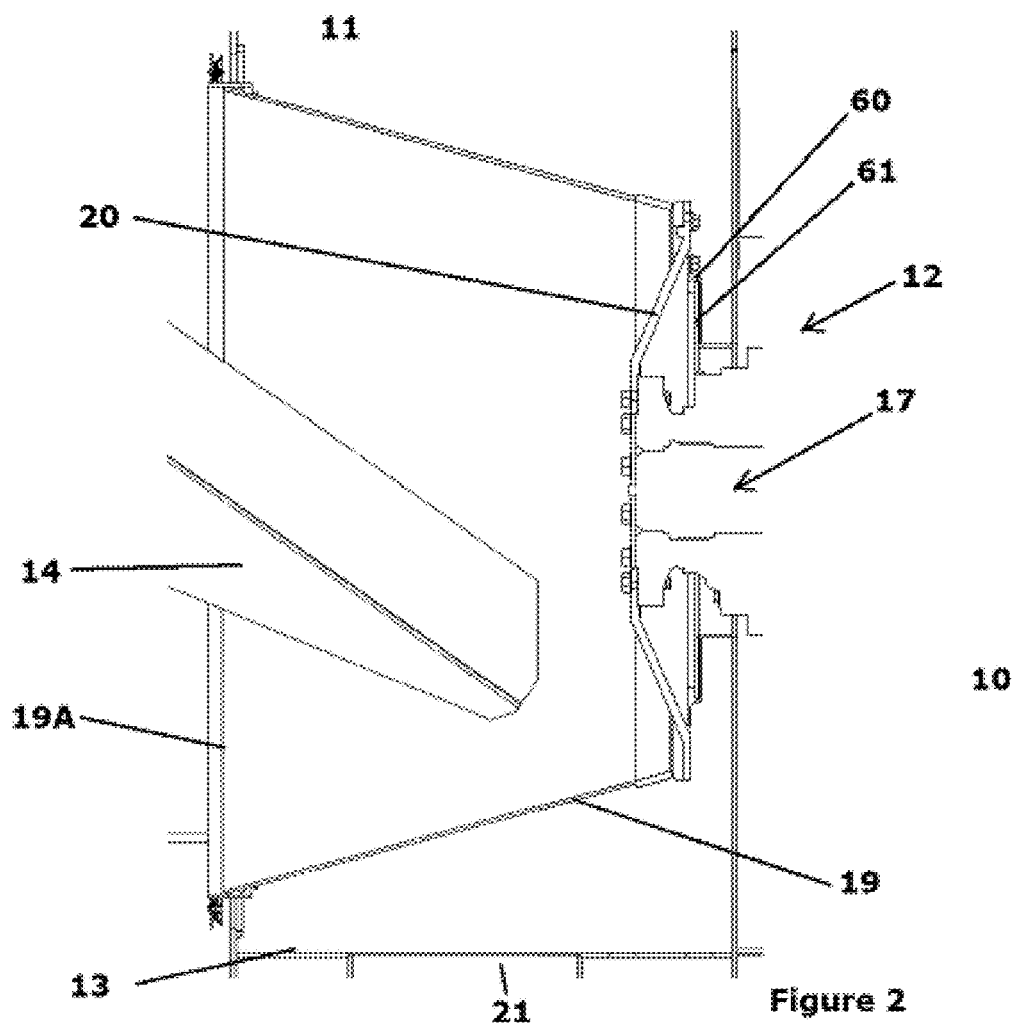
FIG. 2 is a first perspective view of a centrifuge showing the seal according to an embodiment of the invention.
Figure 3:
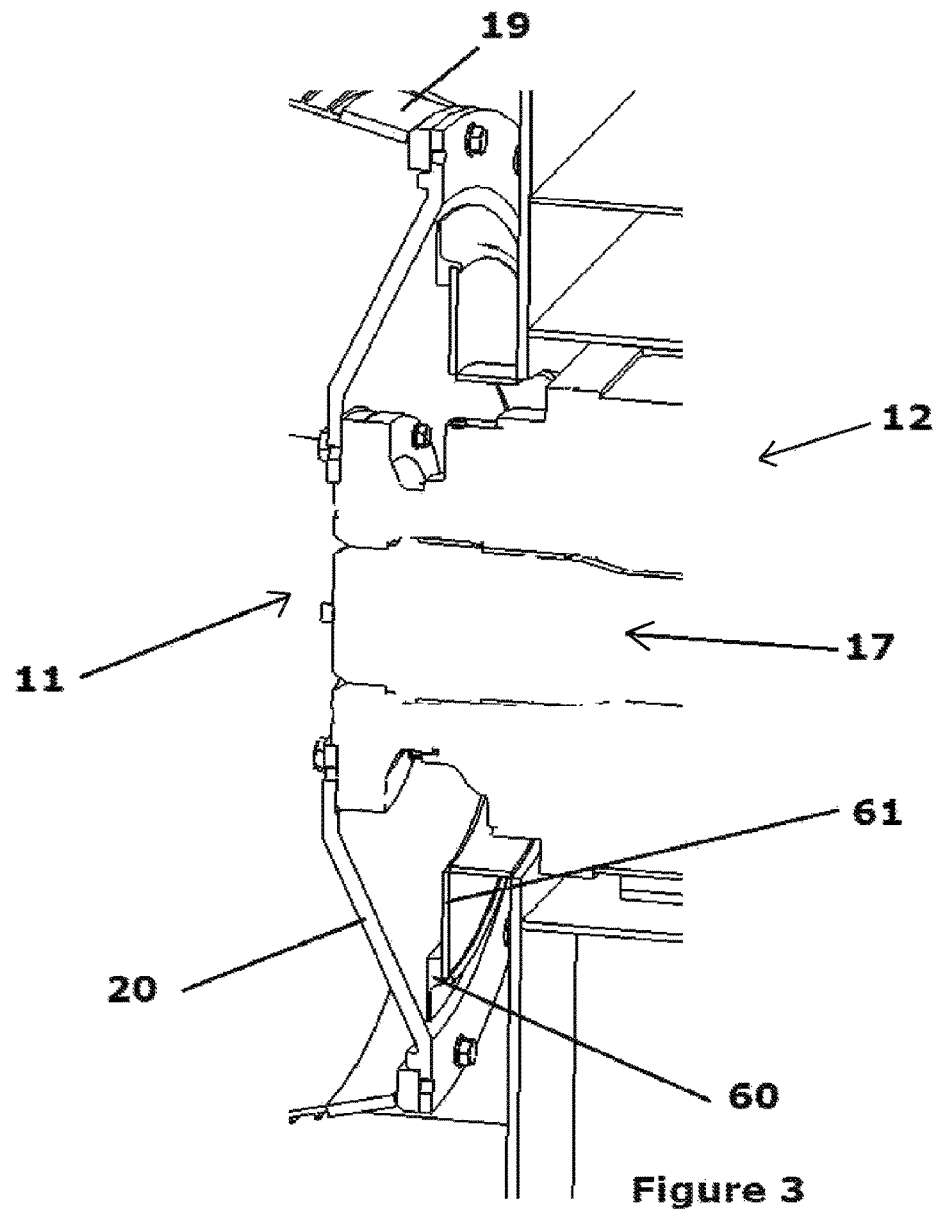
FIG. 3 is a second perspective view of a centrifuge showing the seal according to an embodiment of the invention.
Figure 4:
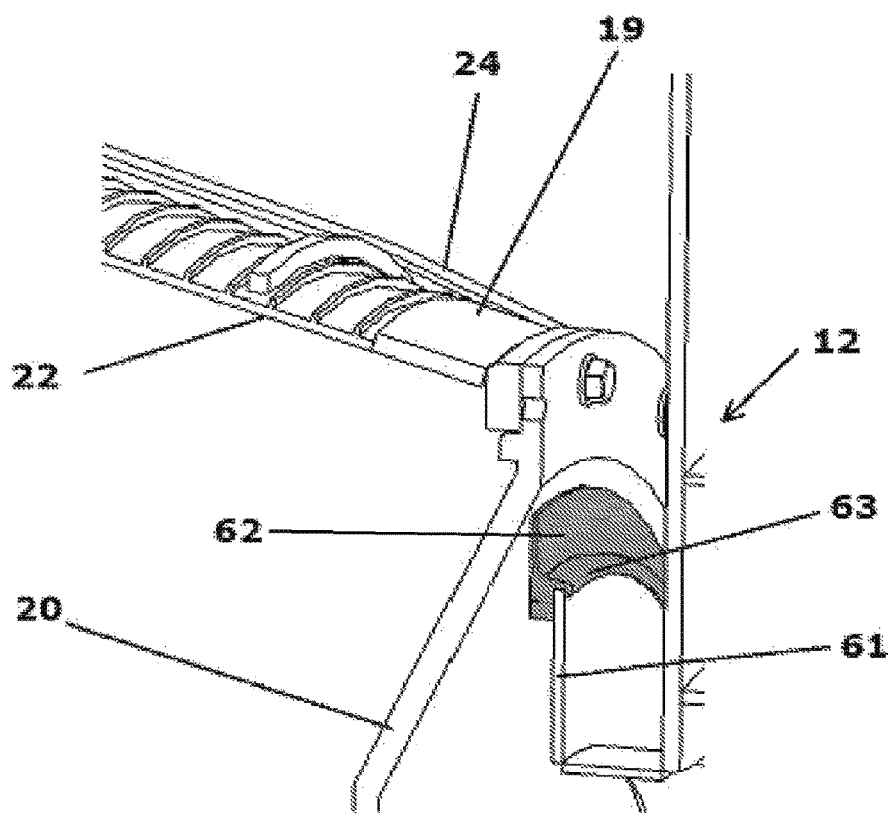
FIG. 4 is a third perspective close-up view showing the seal according to an embodiment of the invention.

As shown in FIGS. 2, 3 and 4, this invention advantageously provides a seal 60 for the centrifuge 10 to prevent any material or liquid being separated inside the effluent portion 11/separation housing 13 from leaking out of the effluent portion 11 into e.g. the drive portion 12. A basket carrier 20 is disposed between the drive portion 12 and effluent portion 11 and is connected to the basket 19. A stiffener 61 is disposed between the basket carrier 20 and the drive portion 12. The seal 60 is disposed between the stiffener 61 and the basket carrier 20, preferably on the face of the basket carrier 20 facing the drive portion 12.

As shown in FIG. 4, in one embodiment the seal 60 has a sealing portion 62 and an attachment portion 63. In this embodiment, the attachment portion 63 is provided to allow the seal 60 to be fixed to the stiffener 61 without the need for fasteners. The attachment portion 63 is advantageous in that it reduces assembly time and minimizes assembly and maintenance costs. In an exemplary embodiment, at least a portion of a first side of the sealing portion 62 abuts at least a portion of the face of the basket carrier 20 which faces the drive portion 12 and at least a portion of a second side of the sealing portion 62 abuts at least a portion of the face of the stiffener 61 facing the basket carrier 20 and the effluent portion 11. In one embodiment, at least a portion of the attachment portion 63 extends over one longitudinal side of the stiffener 61. The attachment portion 63 can be integrally formed with the sealing portion 62 or can be connected to the sealing portion 62 by fasteners such as tension bonds, rivets, screws, rubber glues, clips, pin locks, a wedge and slot mechanism.

In other embodiments, the seal 60 is connected to the stiffener 61 using fastening means, such as tension bonds, rivets, screws, rubber glues, clips, pin locks or a wedge and slot mechanism.

In a preferred embodiment the seal 60 is annular. Preferably the seal 60 is comprised of polyurethane, but can be comprised of alternative materials such as rubber or other flexible elastomers. In another embodiment the seal 60 is comprised of an insert comprised of a material with low stiffness, such as carbon fiber, with an elastomeric coating. In a preferred embodiment the seal 60 is 100% polyurethane in order to reduce the risk of corrosion and to provide intrinsic resistance to wear. It is contemplated that the seal 60 is low in cost and easy to manufacture, as it can be manufactured with a single material pour. The seal 60 reduces the amount of (or in some instances completely eliminates), material and liquid contamination from the effluent portion 11 and separation housing 13 around and into the drive portion 12. The seal 60 increases the longevity of and reduces the risk of premature failure of drive components.

The invention also advantageously provides a sealing arrangement for the centrifuge 10 comprised of a contact seal 71 and a labyrinth disc 70 to prevent liquid from leaking out of the effluent portion 11 and separation housing 13 into the product discharge outlet 23 and to prevent any material from entering back into the effluent portion 11 and separation housing 13 through the product discharge outlet 23 after separation.

Figure 5A:
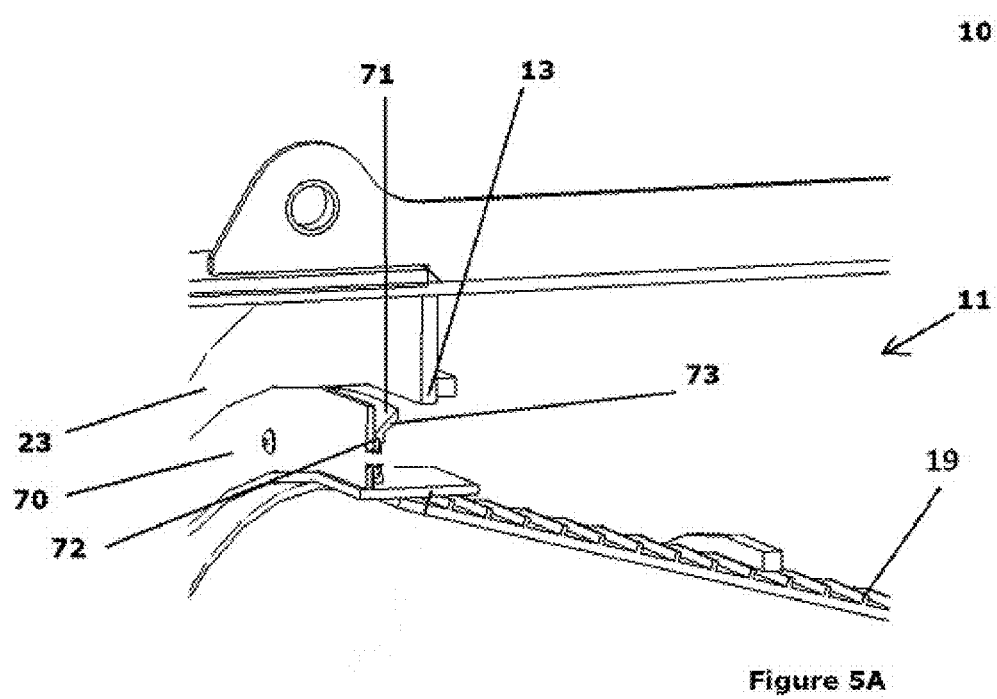
FIGS. 5A and 5B are perspective views of a centrifuge showing the labyrinth disc and contact seal according to an embodiment of the invention.
Figure 5B:
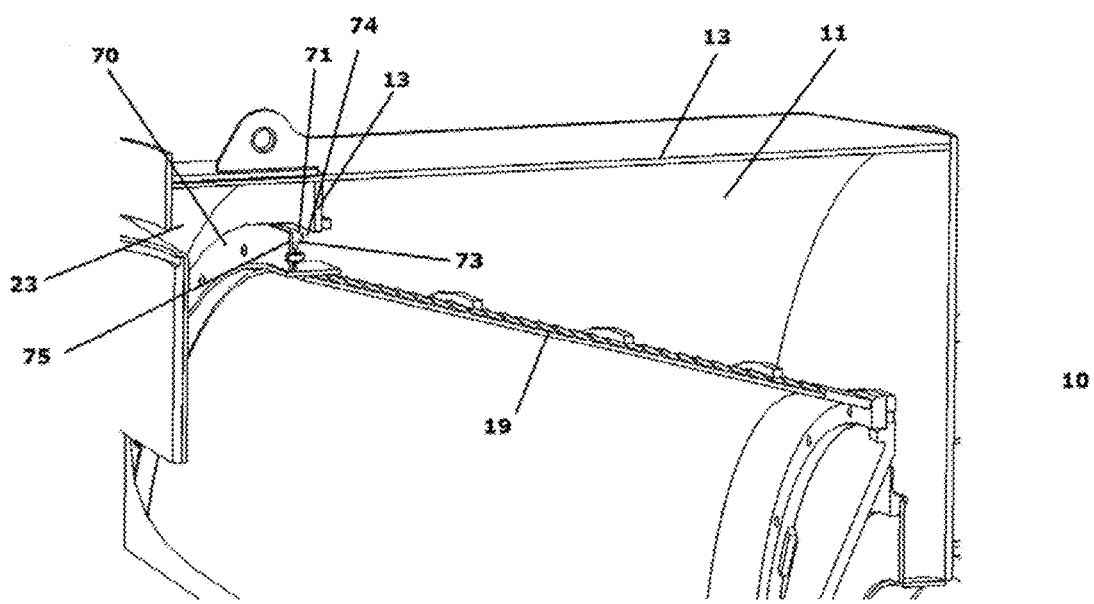
Figure 7:
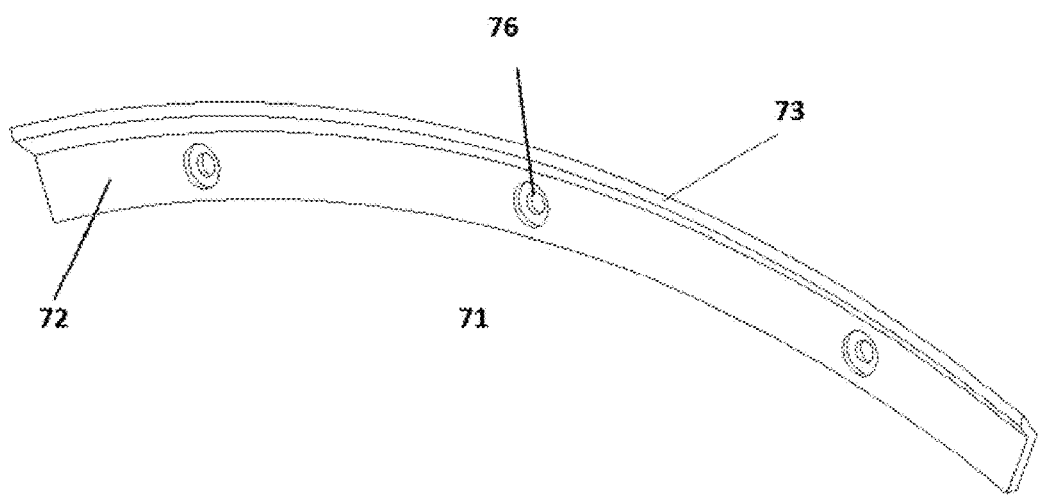
FIG. 7 is a close up view of an annular portion of one embodiment of the outer portion of the contact seal according to an embodiment of the invention.

As shown in FIGS. 5A and 5B, in one embodiment, the contact seal 71 is disposed on the labyrinth disc 70. The labyrinth disc 70 is disposed between the effluent portion 11 and the product discharge outlet 23. In an exemplary embodiment, the contact seal 71 is disposed vertically on a first face of the labyrinth disc 70 and the labyrinth disc 70 is disposed between the effluent portion 11 and the product discharge outlet 23. In one embodiment, the contact seal 71 has a vertical portion 72 and a lip 73. The lip 73 can be for example curved, flat, or at an acute or an obtuse angle. In one embodiment, the vertical portion 72 is disposed parallel to or substantially parallel to the vertical portion of the labyrinth disc 75. In the embodiment shown in FIGS. 5A, 5B and 7, the lip 73 is an integral part of the vertical portion 72, and the lip 73 extends horizontally across a portion of the space 74 between the effluent portion 11 and the product discharge outlet 23. In another embodiment the lip 73 is not an integral part of the vertical portion 72 and is connected to the vertical portion by fasteners.

Figure 6:
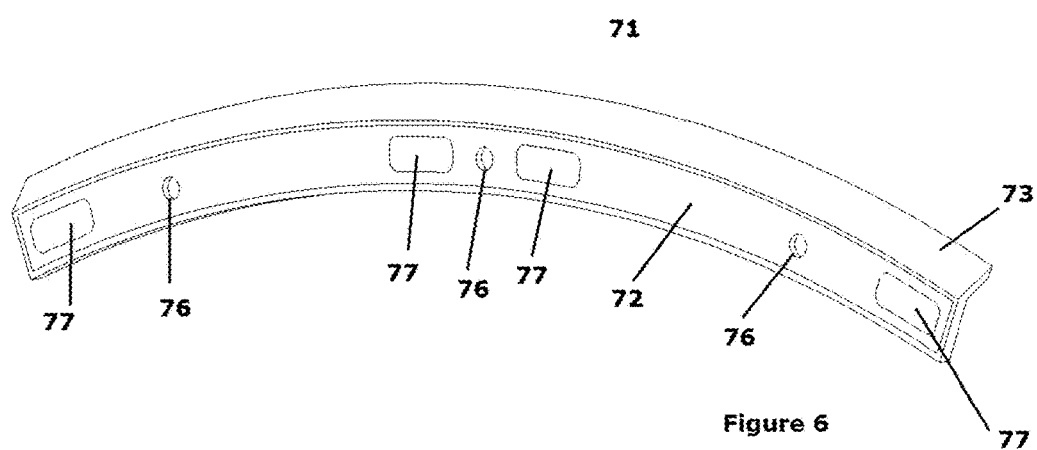
FIG. 6 is a close-up view of an annular portion of one embodiment of the insert of the contact seal according to an embodiment of the invention.

In some embodiments, the contact seal 71 is comprised of polyurethane. In other embodiments the contact seal 71 can be comprised of alternative materials such as rubber or other flexible elastomers. In further embodiments the contact seal 71 can be comprised of an insert (as shown in FIG. 6) comprised of a material with low stiffness, such as carbon fiber, with an elastomeric coating such as polyurethane. In a preferred embodiment the elastomeric coating on the contact seal 71 is 100% polyurethane in order to reduce the risk of corrosion and to provide intrinsic resistance to wear. In the preferred embodiment the contact seal 71 is low in cost and easy to manufacture, as it can be manufactured with a single material pour.

As further shown in FIG. 6, in an exemplary embodiment the contact seal 71 insert can have a plurality of first apertures 76 and a plurality of second apertures 77. In an exemplary embodiment, the plurality of second apertures 77 are used to allow the elastomeric coating, such as polyurethane, to adhere to the contact seal insert. In one embodiment the contact seal 71 is fixed to the labyrinth disc 70 with bolts, or other mechanical fastening means, which protrude through any of the first 76 plurality of apertures (see FIGS. 6 and 7). In other embodiments, the contact seal 71 is connected to the labyrinth disc 70 using fasteners such as tension bonds, rivets, screws, rubber glues, clips, pin locks or a wedge and slot mechanism which can be provided through any or all of the plurality of first apertures 76 or can attach around edge portions of the labyrinth disc 70 and contact seal 71.

Figure 8:
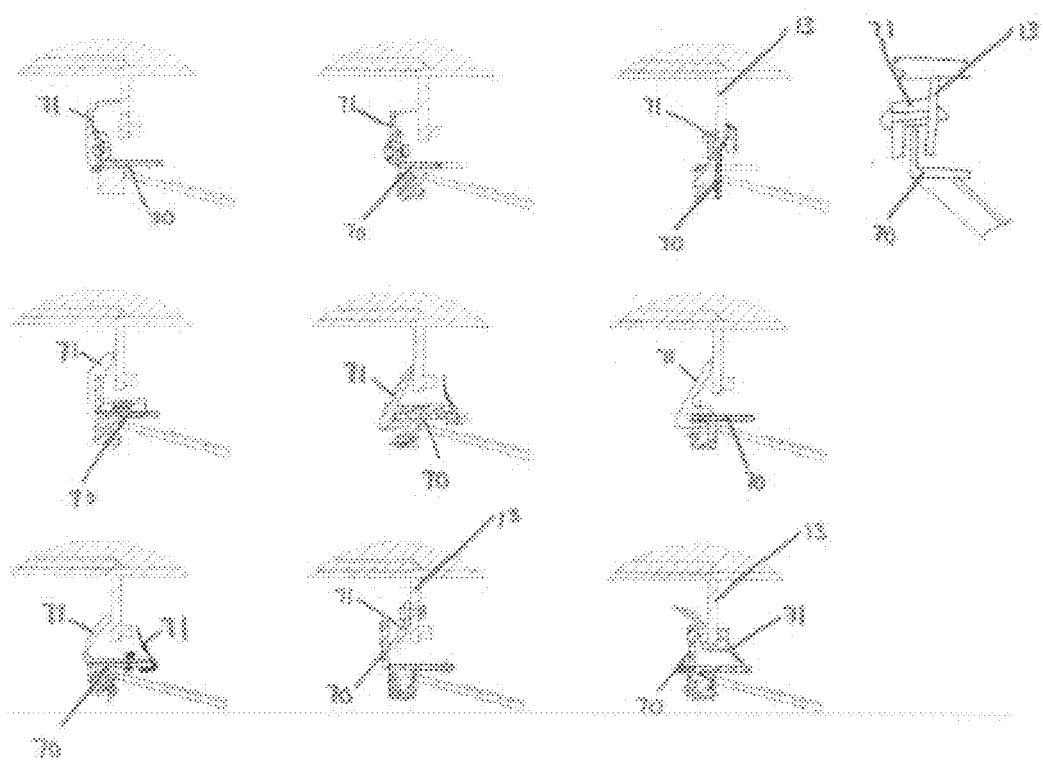
FIGS. 8 illustrates perspective views showing sealing arrangements according to additional embodiments of the invention.
Figure 9:
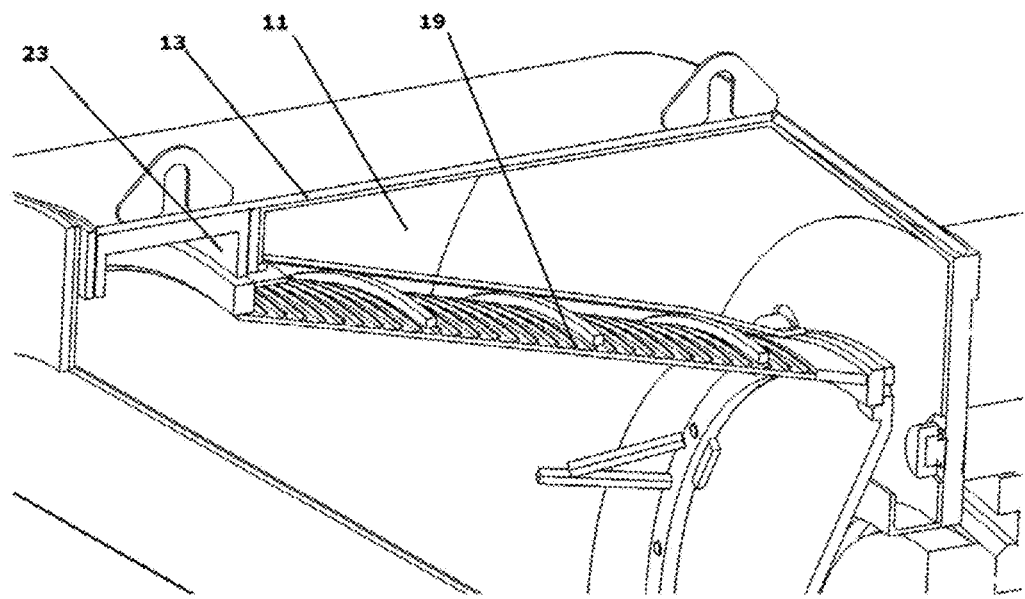
FIG. 9 is a perspective view of a traditional centrifuge showing the close running clearances between the basket and the separation housing.

FIG. 8 shows alternative embodiments of the sealing arrangement comprising a contact seal 71 and labyrinth disc 70 which may be specifically appreciated by a person of ordinary skill in the art. By way of example, in some embodiments the contact seal 71 is disposed on the labyrinth disc 70. In other embodiments, the contact seal 71 is disposed on the separation housing 13. In each of the embodiments shown in FIG. 8, the sealing arrangement prevents liquid from leaking out of the effluent portion 11 into the product discharge outlet 23 and prevents material from entering back into the effluent portion 11 through the product discharge outlet 23. As discussed above, in some embodiments shown in FIG. 8, the contact seal 71 is comprised of polyurethane. In other embodiments show in FIG. 8 the contact seal 71 can be comprised of alternative materials such as rubber or other flexible elastomers. In further embodiments shown in FIG. 8 the contact seal 71 can be comprised of an insert comprised of a material with low stiffness, such as carbon fiber, with an elastomeric coating. In other embodiments shown in FIG. 8 the contact seal 71 is 100% polyurethane in order to reduce the risk of corrosion and to provide intrinsic resistance to wear. Finally, as further discussed above, in some embodiments shown in FIG. 8, the contact seal 71 is connected to the labyrinth disc 70 or the separation housing 13 using fasteners such as tension bonds, rivets, screws, rubber glues, clips, pin locks or a wedge and slot mechanism.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The invention claimed is:

1. A contact seal for preventing liquid from leaking out of an effluent portion into a product discharge outlet of a centrifuge and for preventing material from entering into the effluent portion through the product discharge outlet of the centrifuge, wherein the contact seal is disposed on a labyrinth disc and the labyrinth disc is disposed between the effluent portion and the product discharge outlet, wherein the contact seal is comprised of a plurality of first apertures and wherein the contact seal is attached to the labyrinth disc with fasteners.

2. The contact seal of claim 1, wherein the contact seal is disposed vertically on a first face of the labyrinth disc.

3. The contact seal of claim 2, wherein the contact seal is comprised of polyurethane.

4. The contact seal of claim 3, wherein the contact seal is comprised of a vertical portion and a lip.

5. The contact seal of claim 4, wherein the vertical portion is disposed parallel to or substantially parallel to the vertical portion of the labyrinth disc and wherein the lip extends in the horizontal direction across at least a portion of the space between the effluent portion and the product discharge outlet.

6. The contact seal of claim 4, wherein the vertical portion and the lip are integrally formed.

7. The contact seal of claim 1, wherein the fasteners are bolts.

8. A contact seal for preventing liquid from leaking out of an effluent portion into a product discharge outlet of a centrifuge and for preventing material from entering into the effluent portion through the product discharge outlet of the centrifuge, wherein the contact seal is disposed on a labyrinth disc and the labyrinth disc is disposed between the effluent portion and the product discharge outlet, wherein the contact seal is attached to the labyrinth disc with fasteners disposed around an edge portion of the labyrinth disc and an edge portion of the contact seal.

9. The contact seal of claim 8, wherein the contact seal is disposed vertically on a first face of the labyrinth disc.

10. The contact seal of claim 9, wherein the contact seal is comprised of polyurethane.

11. The contact seal of claim 10, wherein the contact seal is comprised of a vertical portion and a lip.

12. The contact seal of claim 11, wherein the vertical portion is disposed parallel to or substantially parallel to the vertical portion of the labyrinth disc and wherein the lip extends in the horizontal direction across at least a portion of the space between the effluent portion and the product discharge outlet.

13. The contact seal of claim 12, wherein the vertical portion and the lip are integrally formed.

* * * * *